Patented July 7, 1942

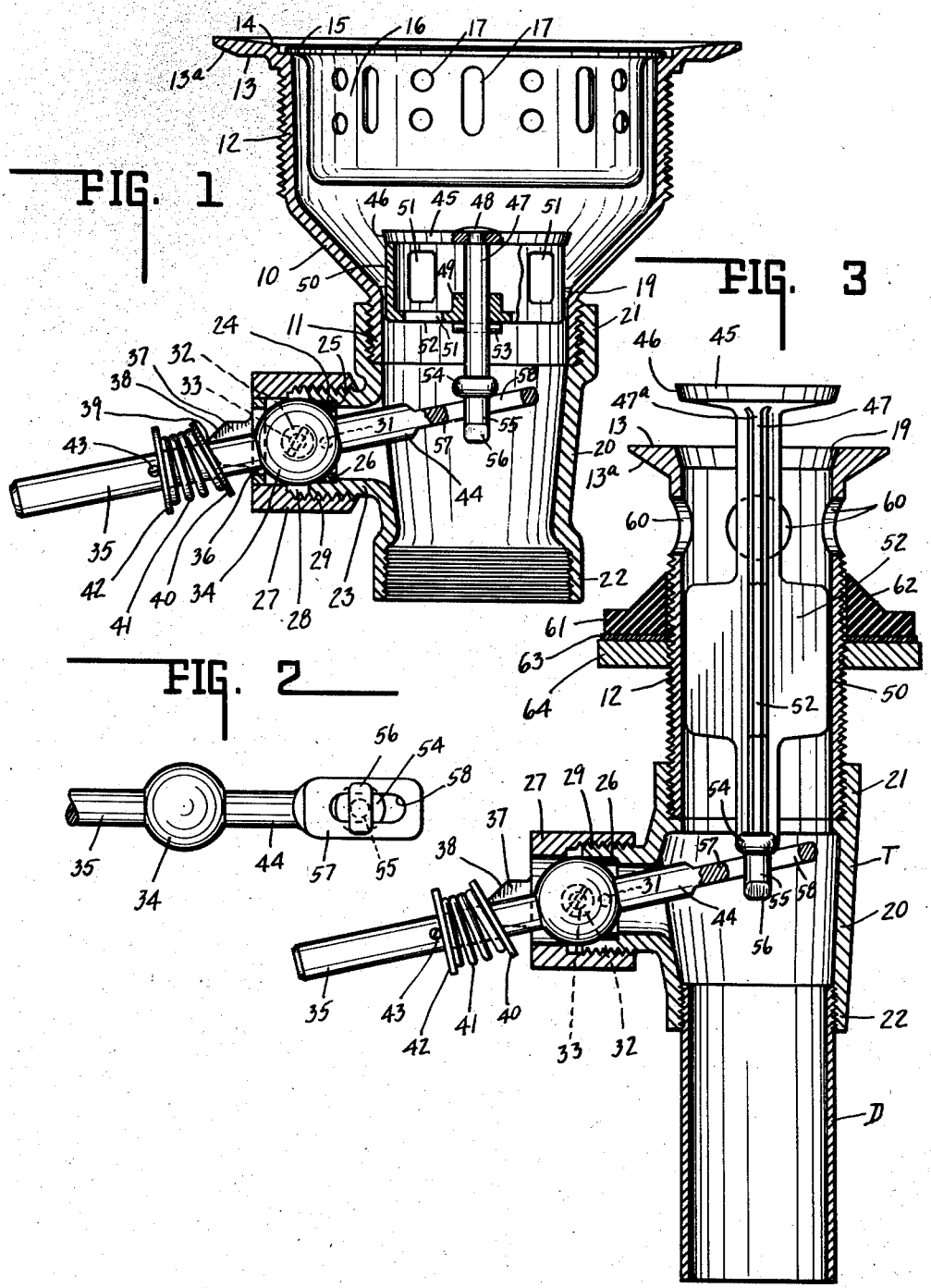

2,288,767

UNITED STATES PATENT OFFICE 2,288,767

DRAIN VALVE ARRANGEMENT

Stephen A. Young, Delphi, Ind., assignor to Globe Valve Corporation, Delphi, Ind., a corporation Application December 5, 1940, Serial No. 368,582

4 Claims. (Cl. 4—200)

This invention relates to a combination drain and valve assembly.

The aforesaid is adapted to be interposed between the waste line and a receptacle such as a wash bowl, lavatory bowl, sink (kitchen or otherwise), or a set (laundry) tub and the like.

One chief object of the present invention is to provide an arrangement whereby the drain valve of the assembly may be controlled or operated for opening and closing the waste outlet and remote from the valve so that wetting of the hand in the receptacle is not a necessary requisite to opening the drain or outlet to drain the receptacle.

Another and equally important object of the invention is to provide a valve assembly such that the valve thereof may be quickly removed for waste line and trap cleaning purposes, such removal being effected without requiring tools.

The chief feature of the invention resides in the construction of the drain and assembly unit such that the aforesaid objects are accomplished.

Other objects and features will be set forth more fully hereinafter.

In the drawing, the invention has been illustrated as applied to two well known general types of drain connections.

The full nature of the invention will be understood from the accompanying drawing, the following description and claims:

In the drawing, Fig. 1 is a central sectional view of the sink type drain and valve embodiment of the invention, parts of the valve unit and operating elements being shown in elevation.

Fig. 2 is a bottom plan view of the latter and its connection to the valve element.

Fig. 3 is a view similar to Fig. 1 and of a lavatory or wash bowl (overflow) type of drain and valve embodiment of the invention.

In Fig. 1 of the drawing there is illustrated an outlet fixture of tubular type having an inwardly flared intermediate portion 10, an externally threaded smaller lower tubular end 11, and an externally threaded larger upper tubular portion 12, the latter at its upper end being provided with a lateral flange 13, beveled as at 13a. The flange adjacent its connection to portion 12 is recessed at 14 to form a seat for the outwardly directed peripheral flange 15 of a strainer 16 having draining openings 17 therein, as well as in the bottom.

The flange 13 is adapted to seat in a recess, with or without a gasket, in a sink outlet or drain opening. A cooperating nut and gasket on the threaded portion 12 serves to rigidly mount the aforesaid fixture to the sink when the nut is threaded upwardly on portion 12 to bear against the lower portion of the sink, as is well understood in the plumbing art. The interior junction of portions 10 and 11 is tapered forming a valve seat 19.

A T 20 of reducing character includes internally threaded upper end 21 for connection to the lower end 11 of the fixture, internally threaded lower end 22 for connection to the upper end of the trap, and the externally threaded lateral portion 23, the interior thereof being enlarged at 24 to form shoulder or seat 25.

Seated in the enlargement 24 and bearing against shoulder 25 is tubular gland 26 having an opposite face conforming to a sphere. A packing gland nut 27 is enlarged internally at 28 and such enlargement is threaded as at 29. A set screw 31 locks nut 27 to portion 23. Nut 27 threadedly supports a screw 32 which has a pivot portion 33 extending into the tubular arrangement 23—27 and into a ball-shaped member 34 to pivotally retain the same in bearing relation against gland 26 to seal outlet 23.

An arm 35 extends into the spherical member 34 and extends beyond nut 27 to form a handle for remote operation of the valve. The end of nut 27 includes an elongated recess 36 through which arm 35 projects. At each side of the recess is a V-shaped extension 37, said extension including tapered faces 38 merging at 39. These extensions are spaced apart.

A washer, plate or like relatively rigid member 40 is slidably mounted on rod 35 and constitutes a rocker member. It is backed by spring 41 bearing thereon and on washer 42 at opposite ends. Washer 42 is retained on rod 35, about which the spring 41 is coiled, by cotter key 43.

When the handle 35 is tilted downwardly over centers 39 of portions 37, the rod 44, rigid with ball 34 and extending therefrom oppositely from rod or handle 35, is moved upwardly and when handle 35 is tilted upwardly rod 44 is tilted downwardly, the structure in both cases moving "over-center" and automatically locking in that position.

The valve member 45 has face 46 for cooperation with seat 19. The valve mounts stem 47 rivetted thereto at its upper end 48. The stem extends through collar 49 of a cylindrical guide 50 having ports 51 therein and in connecting portion 52. This arrangement is secured together as at 53.

The stem 47 is extended downwardly and as at 54 terminates in a peripheral collar or stop.

From the same extends a reduced portion 55, the lower end of which terminates in a transverse portion 56, same being of the same width as portion 55 but extending oppositely from the same as shown in Fig. 2.

The handle operable rod 44 has its inner free end flattened as shown at 57 and therein is formed the longitudinally extending elongated bore 58, the width of which will pass the head 56 on the stem and seat the reduced portion 55. The thickness of the flattened portion 57 is less than the axial length of portion 55, as shown.

The aforesaid provides a positive but quick detachable connection between the stem and handle, same being effected by initial axial registration and then limited rotation and then rotation until registration is effected followed by axial movement to effect connection and disconnection respectively.

When the handle is in the position shown in Fig. 1, the upper face of the flattened portion 57 engages the lower face of the stop 54 on the valve stamp and holds the valve 45 elevated. Whatever liquid is in the sink or receptacle to which the fixture 10, 11 and 12 is attached as aforesaid then drains through the strainer 16 and through the openings 51 in the cylindrical guide 50 which are then exposed by being elevated with the valve 45. The liquid flowing therethrough passes outwardly through portion 22 of the fitting, leakage being prevented by the gland 26. The valve is held in this position because the rocker plate 40 bears on the lower inclined faces 38 of the portions 37. When the handle is elevated and is positioned approximately above the horizontal plane through the pivot 33 and approximately the same distance that the handle, shown in Fig. 1, is positioned below such a plane, the rocker plate 40 in moving from one position to the other moves toward the retainer plate 42 compressing spring 41, then, after passing over center, tilts in the reverse direction and finally bears against the upper faces 38 of the aligned portions 37.

In that movement the lower face of the flattened portion 57 engages the upper faces of the two extensions 56 on the stem 47 and draws the valve downwardly and with it the guide 50—52. The valve 45 then has face 46 engaging seat 19 to seal the drain arrangement. It is to be understood that the length of the stem portion 55 is sufficient to permit slight relative movement between said stem and the flattened portion 57 so that the valve can seat positively and will be positively seated because of the pressure exerted between spring 41 holding the handle 35 in elevated position and, consequently, portion 57 in depressed position.

As previously set forth, whenever it is desired to remove the valve the handle is depressed to the full line position shown in Fig. 1. Then after the strainer 16 has been lifted out of the fixture 10, 11 and 12, the valve is rotated 90° which aligns the portions 56 with the elongation of the slot 58. Then the valve guide and stem can be lifted vertically from the handle structure and removed from the aforesaid fixture.

Upon removal, the entire waste line system, including the trap, etc., not shown, is exposed and a flexible cleaner conventional to the plumbing industry and now sold in the dime stores for householders use can be inserted and forced into the drain and through the trap since such elements are usually about three to four feet long. Thus, any positive obstruction not removable by chemical action and tending to clog the drainage system can be forced through so that it can be in a position to pass readily to the sewer connections, it being understood that the available area between the flattened portion 57 with the arm 44 and the interior of the T fitting 20 is such to permit relatively free passage of such cleaning element.

Following cleaning operation, the cleaning element is removed by being pulled upwardly. Then the valve is repositioned with the wing portions 56 aligned with the elongation of the slot 58 and dropped into place. When it is dropped into place, the collar 54 limits further descent. Then the valve is rotated 90°, which positions the portions 56 below the flattened portion 57 and in locked relation relative thereto.

The strainer is then replaced. To close the valve, the handle 35 is elevated. The foregoing structure permits the receptacle, to which the fixture aforesaid 10, 11 and 12 is attached, to be drained without requiring the householder to insert the hand into the liquid in the receptacle. In other words, the structure is a remote control for the valve 45.

It is obvious also that valves may be readily replaced and valve seats readily refaced. Also, valves may be readily refaced. In view of the fact that the length of the portion 55 is such that a "sloppy" connection is obtained between the stem and the flattened portion of the arm 44, there is sufficient accommodation to permit such refacings if such ever be required.

Other advantages too numerous to mention will be self-evident from the foregoing description and illustrations.

Reference will now be had to Fig. 3. In this figure, like numerals indicate the same or similar parts. This embodiment of the invention is intended for association with a lavatory or wash bowl or with a bath tub. In these types of sanitary fixtures, there is a so-called overflow outlet and that overflow is usually an integral part of that sanitary fixture. The lower end of that overflow is arranged to communicate with the drain from that fixture.

Herein, the portion 13 with the face 13a is seated in the upper face of the drain outlet of the sanitary fixture. The portion 12, which is externally threaded, is substantially cylindrical. The lower end thereof is received by the T fitting 20 having internally threaded portion 21. The lower internally threaded portion 22 is arranged for connection to the drain line D or the top or entrance to the trap.

The handle structure of the valve arrangement is substantially as previously described. The stem 47 is herein shown reenforced by ribs 47a. The upper end of the stem mounts the valve member 45 having the face 46. Herein, the junction of the flange portion 13 with the threaded portion 12 is provided with the seat 19. The portion 12 slightly below the flange portion 13 is provided with openings 60. These openings communicate with the aforesaid overflow arrangement so that regardless of whether the valve is open or closed, the overflow can and always will drain without obstruction to the waste including the trap, not shown, regardless of valve position.

Herein, the valve structure is shown provided with a guide arrangement in the form of radially directed wings 52 having elongated guiding faces 50. Four of such wings are provided herein and these are transversely arranged forming a cross or X guide. This insures valve guidance in the tubular portion 10, 11 and 12 without obstruction to normal drainage.

There is also shown provided in Fig. 3. a tubular gasket element 61 which has a frusto-conical extension 62 adapted to engage the sanitary fixture such as the bottom of the tub, lavatory or wash bowl and below the overflow communication to opening 60. Therebeneath is the metal washer 63. Bearing thereon is the nut 64 which serves, when elevated on the threaded portion, to sealingly clamp the entire valve structure assembly in fluid tight relation to the receptacle, including the overflow arrangement. The remainder of the valve assembly arrangement, including the handle control, is substantially that previously described with reference to Fig. 1.

Fig. 2 is equally applicable as a bottom plan view of the corresponding portion of the invention shown in Fig. 3. The operations and advantages of the embodiment of the invention shown in Fig. 3 are the same as that previously set forth with reference to the embodiment illustrated in Fig. 1.

It is to be noted that in this instance there is no superposed strainer requiring removal before valve removal can be effected.

While the invention has been illustrated and described in great detail in the foregoing description, the same is to be considered as illustrative and not restrictive in character.

The several modifications described herein, as well as others which will readily suggest themselves to persons skilled in this art, are all considered to be within the broad scope of the invention, reference being had to the appended claims.

The invention claimed is:

1. A position holding arrangement for a valve operating member pivoted intermediate its ends, one end being arranged for interior connection to a valve and the other end being externally exposed for member movement including in combination a pair of external, spaced, outwardly extending projections each having laterally and oppositely inclined opposed faces, the member being positioned between the projections and projecting beyond the same, a coil spring about the member and having one end secured to the member remote and outwardly from the projections and directed toward the same, and another member loose on the first mentioned member and capable of sliding as well as tilting thereon, the other end of the spring operatively bearing thereon to constrain the sliding member and tilting into engagement with one pair or the other of the similarly inclined faces to retain the first mentioned member in the corresponding position but permitting forcible movement into the other position thereof.

2. In a drain valve assembly, the combination of a reciprocable drain valve portion, an elongated projecting centrally positioned stem member, an elongated valve operating member extending in a general direction transverse to the stem and pivotally tilting toward and away from the valve portion, one member having an elongated slot in one end in juxtaposition to the adjacent end of the other member, the slot elongation being in the direction of elongation of the member including the slot, the non-slotted member having stop means spaced from the end thereof adjacent the slotted member and preventing extended movement through the slot, and transverse means on the end of the stop means supporting member and spaced from said stop means and of a width and length when registering with the slot to pass therethrough and when passed therethrough to detachably lock said members together when positioned angularly of its slot passing positioning, rotation in the reverse direction of the transverse means supporting member and then movement thereof longitudinally and in the direction of the stop means effecting member separation and without movement of the slotted member or any other member.

3. An assembly as defined by claim 2, characterized by the stem member supporting the stop and transverse means and the valve operating member including the elongated slot.

4. In a drain valve assembly, the combination of a reciprocable drain valve portion, an elongated projecting centrally positioned stem member, an elongated valve operating member extending in a general direction transverse to the stem and pivotally tilting toward and away from the valve portion, one member having an elongated slot in one end in juxtaposition to the adjacent end of the other member, the slot elongation being in the direction of elongation of the member including the slot, the non-slotted member having stop means spaced from the end thereof adjacent the slotted member and preventing extended movement through the slot, transverse means on the end of the stop means supporting member and spaced from said stop means and of a width and length when registering with the slot to pass therethrough and when passed therethrough to detachably lock said members together when positioned angularly of its slot passing positioning, rotation in the reverse direction of the transverse means supporting member and then movement thereof longitudinally and in the direction of the stop means effecting member separation and without movement of the slotted member or any other member, and valve guide means extending parallel to the stem for valve guidance and stem end registration with the slot.

STEPHEN A. YOUNG.